US009753880B1

(12) United States Patent
Sodke et al.

(10) Patent No.: US 9,753,880 B1
(45) Date of Patent: Sep. 5, 2017

(54) METHOD AND SWITCH FOR TRANSFERRING TRANSACTIONS BETWEEN SWITCH DOMAINS

(71) Applicant: Microsemi Solutions (U.S.), Inc., Aliso Viejo, CA (US)

(72) Inventors: Richard David Sodke, Burnaby (CA); Kuan Hua Tan, Coquitlam (CA); Robert Kristian Watson, Burnaby (CA); Larrie Simon Carr, Kelowna (CA)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 119 days.

(21) Appl. No.: 14/925,035

(22) Filed: Oct. 28, 2015

Related U.S. Application Data

(62) Division of application No. 14/136,476, filed on Dec. 20, 2013, now Pat. No. 9,336,173.

(51) Int. Cl.
| | |
|---|---|
| *G06F 13/00* | (2006.01) |
| *G06F 13/40* | (2006.01) |
| *G06F 13/42* | (2006.01) |
| *G06F 3/06* | (2006.01) |

(52) U.S. Cl.
CPC ........ *G06F 13/4022* (2013.01); *G06F 3/0619* (2013.01); *G06F 3/0665* (2013.01); *G06F 3/0689* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,356,636 B2 | 4/2008 | Torudbakken et al. | |
| 7,421,532 B2 | 9/2008 | Stewart et al. | |
| 7,454,552 B2 | 11/2008 | Stewart et al. | |
| 8,122,177 B1 | 2/2012 | Puranik | |
| 8,244,951 B2 | 8/2012 | Davis et al. | |
| 9,146,890 B1 * | 9/2015 | Brown | G06F 13/4022 |
| 9,542,350 B1 * | 1/2017 | Kissell | G06F 13/4068 |

(Continued)

OTHER PUBLICATIONS

U.S. Appl. No. 14/136,476, Office Action dated Nov. 4, 2015.
U.S. Appl. No. 14/136,476; Notice of Allowance dated Mar. 14, 2016.

*Primary Examiner* — Elias Mamo
(74) *Attorney, Agent, or Firm* — Dennis R. Haszko

(57) ABSTRACT

The disclosure generally relates to a PCIe switch that includes a selectively transparent bridge that selectively allows transactions to traverse between multiple PCIe domains without the encumbrance of each root complex entity requiring knowledge of the selectively transparent bridge. The bridge that enables the transactions is invisible to the root complex entity in a host and drive switch domain of the PCIe switch. No address translation of the transactions is required because the drive switch domain address map is a subset of the host switch domain address map. The bridge allows for extremely low latency transactions between host systems and storage drives because the bridge allows the storage drive to read the Direct Memory Access (DMA) Scatter-Gather List (SGL) directly from host memory. The bridge also allows I/O data reads and writes from the storage drive directly to the host memory without store and forward within a RAID controller's memory.

17 Claims, 12 Drawing Sheets

(56) References Cited

U.S. PATENT DOCUMENTS

| | | | |
|---|---|---|---|
| 2006/0242354 A1* | 10/2006 | Johnsen | G06F 13/404 |
| | | | 710/316 |
| 2009/0164694 A1* | 6/2009 | Talayco | G06F 13/4022 |
| | | | 710/316 |
| 2009/0198863 A1 | 8/2009 | Gregg | |
| 2010/0228943 A1 | 9/2010 | Deshpande et al. | |
| 2012/0185632 A1 | 7/2012 | Lais et al. | |
| 2014/0372657 A1 | 12/2014 | Jones et al. | |

\* cited by examiner

METHOD AND SWITCH FOR TRANSFERRING TRANSACTIONS BETWEEN SWITCH DOMAINS

CROSS-REFERENCE

This application is a divisional of U.S. patent application Ser. No. 14/136,476 filed on Dec. 20, 2013, which is hereby incorporated by reference.

FIELD

The present disclosure relates generally to a method for communicating between a storage device and a host utilizing a Peripheral Component Interconnect Express (PCIe) communication protocol.

BACKGROUND

In a PCIe system, a root complex entity utilizes PCIe ports to connect a host processor and its memory subsystem to one or more endpoints. The host memory subsystem can include a number of caching levels and off-chip RAM memory. The one or more endpoints often provide interfaces to non-cabled endpoints or external cabled communications links, such as Ethernet. Alternatively, in a PCIe based server, the one or more endpoints provide access to bulk storage devices, such as hard disk drives, solid-state storage drives, or other types of storage media. Bulk storage devices may be connected directly to a host processor and may communicate with the host processor utilizing a PCIe protocol. Alternatively, bulk storage devices may be connected to a host processor via a PCIe bridge and may communicate utilizing a "storage specific protocol", such as Serial Attached Small Computer System Interface (SAS) protocol or Serial Advanced Technology Attachment (SATA) protocol. When a required number of endpoints exceed the number of PCIe ports that are natively available from a computer chipset of a host processor, an external PCIe switch provides port expansion.

An external PCIe switch passes PCIe transactions between a root complex entity and endpoints, or between two endpoints within a single domain. Examples of PCIe transactions include request transactions, such as a Memory Read Request and a Memory Write Request, response transactions, such as Completions, and configuration transactions, such as a Configuration Read Request and a Configuration Completion. Generally, a domain includes exactly one root complex entity, and the root complex entity is responsible for enumerating all switch ports and endpoints in a particular domain. Enumeration refers to the discovery and numbering of buses, for example by reading a vendor ID and device function. A PCIe switch with a single domain may also be referred to as a transparent PCIe switch because the PCIe switch allows configuration transactions from a root complex entity to pass to all endpoints. The PCIe switch also allows transactions to pass between any initiator and target attached to the PCIe switch.

An example of a known PCIe system 100 that includes a transparent PCIe switch 102 is shown in FIG. 1. In the PCIe system 100, a host processor 104 is connected to multiple endpoints EP1, EP2, EP3, EP4, . . . , EPn through the transparent PCIe switch 102. The transparent PCIe switch 102 includes an upstream switch port 106, and multiple downstream switch ports DSSP1, DSSP2, DSSP3, DSSP4, . . . , DSSPn. The host processor 104 includes a root complex entity 108. The root complex entity 108 of the host processor is connected to the upstream switch port 106 of the transparent PCIe switch 102. Each downstream switch port DSSP1, DSSP2, DSSP3, DSSP4, . . . , DSSPn of the transparent PCIe switch 102 is connected to a respective one of the endpoints EP1, EP2, EP3, EP4, . . . , EPn. As shown in FIG. 1, the endpoints EP1, EP2, EP3, EP4, . . . , EPn, which are physical storage devices, such as hard disk drives or solid state drives, are external to the transparent PCIe switch 102. Alternatively, when one or more of the endpoints EP1, EP2, EP3, EP4, . . . , EPn are not physical storage drives, these endpoints may be internal to the transparent PCIe switch 102.

In contrast to the PCIe system 100 shown in FIG. 1, a PCIe bridge is a component of a PCIe system that supports translation, such as between protocols or between virtual domains. There are generally two types of PCIe bridges. The first type is a PCIe bridge that changes a communication protocol between an initiator and target. For example, a PCIe to PCI-X bridge performs protocol conversion between two different protocol standards to allow communication between an initiator and a target.

The second type is a PCIe bridge that allows transactions to pass between two distinct and separate Virtual Switches, also known as PCIe switch domains. PCIe switch domains are used, for example, to provide domain isolation, such as electrical and logical isolation of processor domains. A Non-Transparent PCIe Bridge (NTB) is an example of the second type of PCIe bridge. In an NTB, two or more entirely separate PCIe switch domains, each with a host root complex entity, may communicate with each other and may share communications with any number of endpoints in either PCIe switch domain. A significant limitation of a NTB is that a root complex entity on one side of the bridge is unaware of endpoints, or another root complex entity, on an opposing side of the bridge. The development of custom host drivers that utilize a switch vendor proprietary mechanism is required to communicate information about a PCIe switch domain to a host processor behind the NTB bridge.

An example of a known PCIe system 200 that includes a single domain PCIe switch 202 with Non-Transparent Bridge support is shown in FIG. 2. The single domain PCIe switch 202 connects two host processors 204, 206 to multiple endpoints EP1, EP2, EP3, EP4, . . . , EPn.

The single domain PCIe switch 202 includes an upstream switch port 208, a non-transparent bridge (NTB) 210, a switch crossbar 212, and multiple downstream switch ports DSSP1, DSSP2, DSSP3, DSSP4, . . . , DSSPn. The upstream switch port 208 and the NTB 210 are each connected to PCIe switch routing, or PCIe switch crossbar, 212. Each downstream switch port DSSP1, DSSP2, DSSP3, DSSP4, . . . , DSSPn is also connected to the switch crossbar 212 and to a respective one of the storage drives EP1, EP2, EP3, EP4, . . . , EPn.

The host processor 204 includes a root complex entity 214 that is connected to the upstream switch port 208 of the single domain PCIe switch 202. The host processor 206 includes a root complex entity 216 that is connected to the NTB 210 of the single domain PCIe switch 202.

The NTB 210 allows the root complex entity 216 to communicate with PCIe targets within this single domain by presenting two endpoints 218, 220, each with associated Base Address Registers (BARs), memory windows, and address translation between the PCI Address spaces. Other features such as doorbell registers to support messaging between domains may also be supported.

While the PCIe protocol can provide access to individual storage drives or endpoints, there are often situations in which it is desirable to use a redundant array of inexpensive disks (RAID) system. A storage RAID system generally includes one or more host devices, a RAID controller, and two or more storage drives. In general, separate communication protocols are utilized for the host device to communicate with the RAID controller, the RAID controller to communicate with the storage drives. The RAID controller presents one or more RAID volumes to the host device. The RAID volumes are virtual storage elements that may bear no resemblance to a physical storage drive topology.

A host device is typically interconnected with a RAID controller utilizing a PCIe interconnect protocol, while the RAID controller may be interconnected with storage drives utilizing another protocol, such as the SAS protocol, the SATA protocol, or the PCIe protocol. When the PCIe protocol is utilized to connect a RAID controller to the multiple storage drives, inherent problems exist due to the domain switching and address ranges that are addressed.

A generic block diagram for a RAID system is shown in FIG. 3. The RAID system 300 includes a host system 302, two storage drives 304, and a RAID controller 306 that connects the host system 302 to the two storage drives 304. The RAID controller 306 connects and presents the two storage drives 304 as a logical unit, or volume, to the host system 302. The logical unit, as seen by the host system 302, bears no resemblance to the physical typology of the storage drives 304. Data is distributed to the two storage drives 304 by the RAID controller 306 to improve redundancy and/or performance as compared to using only a single storage drive.

The host system 302 does not directly address or access the two storage drives 304 but rather communicates with them through the RAID controller 306. The RAID controller 306 provides redundant protocol algorithms, virtualizes transactions between the host system 302 and the two storage drives 304, addresses of the two storage drives 304, and provides error handling. The RAID controller 306 includes a controller host interface 308, a RAID processing engine 310, and a drive bridge 312.

The host system 302 communicates with the controller host interface 308 of the RAID controller 306 using a protocol, such as the PCIe protocol. The RAID processing engine 310 may communicate with the storage drives 304 through the drive bridge 312 using a protocol, such as the PCIe protocol, the SAS protocol, or the SATA protocol. The drive bridge 312 performs the translation between the protocols. The RAID processing engine 310 may also provide read and/or write caching of data from the two storage drives 304. The RAID processing engine 310 may also temporarily stage data that passes between the host system 302 and the two storage drives 304, which increases the latency of transactions between the host system 302 and the two storage drives 304.

RAID storage systems may benefit from the availability of high performance, low latency PCIe based storage drives. However the traditional RAID controller architecture and the existing PCIe based switching solutions either fail to meet the requirements of a RAID system, or significantly decrease the performance benefits of RAID systems that use low latency PCIe Drives.

In a storage RAID system, the host system must not directly address or access the physical storage drives. Instead, the host system must only see virtualized drives comprised of RAID volumes inside a RAID controller.

For SAS or SATA based storage systems, this virtualization is achieved by having logical protocol separation between the host bridge and the controller bridge. When SAS or SATA based storage drives are simply replaced by PCIe based storage drives, the I/O data needs to be staged temporarily within a RAID controller. This significantly increases the latency of transactions between storage drive and the host system, which is undesirable and contrary to the performance requirements of a native PCIe architecture. An alternative architecture uses existing PCIe switching technology which exhibits inherently low latency.

Existing PCIe switches, however, do not inherently provide support for storage drive virtualization. Significant effort in the development of custom drivers is therefore necessary to support the requirements of a RAID system. For example, an existing transparent PCIe switch cannot be used in a RAID system because the host system will enumerate and have access to the physical storage drives, which is unacceptable in a RAID system. Thus, the RAID controller must use two physical or virtual switches to separate the host domain from the drive domain.

When existing multi-domain switches are used in a RAID system, all transactions are required to pass through the RAID controller's internal memory. This increases the latency between host processor and the storage drive relative to the latency achieved when the storage drive is directly connected to the host processor. The increased latency when using a multi-domain switch in a RAID system negates the primary benefit of adopting PCIe based drives.

A Non-Transparent Bridge (NTB), implemented using a PCIe switch with multiple domains, allows isolation between a host domain and drive domain, while still allowing transactions to flow between the host domain and the drive domain. The use of an NTB in a RAID controller, however, creates complications. For example, when an NTB is connected to an upstream switch port, as shown in FIG. 2, the host processor may only see the endpoint associated with the NTB. The host processor cannot enumerate the resources, including the virtual functions, in the internal endpoint of the RAID controller and standard PCIe configuration cycles cannot be used to configure and manage the RAID controller. Thus, standard PCIe compatible drivers cannot be used to communicate between the host processor and a RAID controller. This makes configuration and management of a RAID controller by the host processor significantly complex. Also, the NTB inherently adds additional latency to all transactions when the transactions must traverse two endpoints and address translation logic within the NTB.

Improvements in methods for communicating between a storage device and a host utilizing a PCIe communication protocol are desirable.

DETAILED DESCRIPTION

Figure 1:
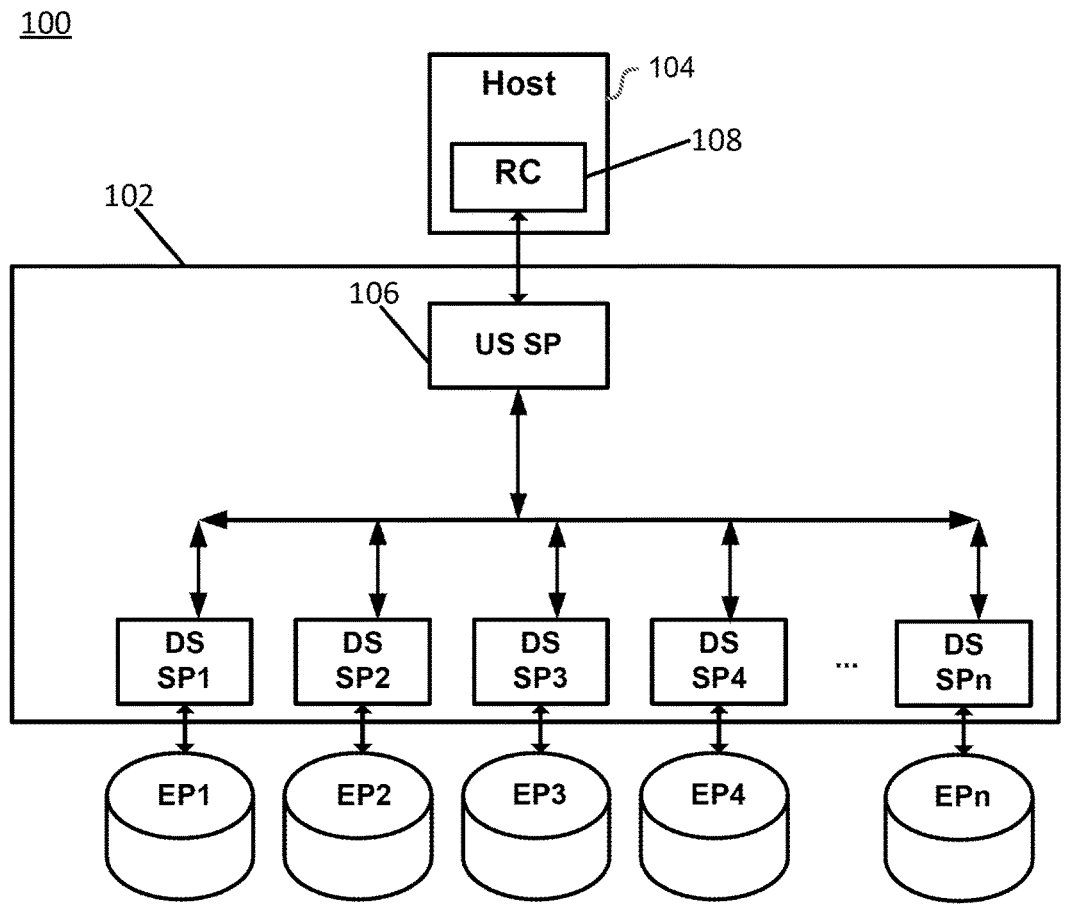
FIG. 1 is a block diagram of a known PCI Express communication system with a Transparent PCI Express switch.
Figure 2:
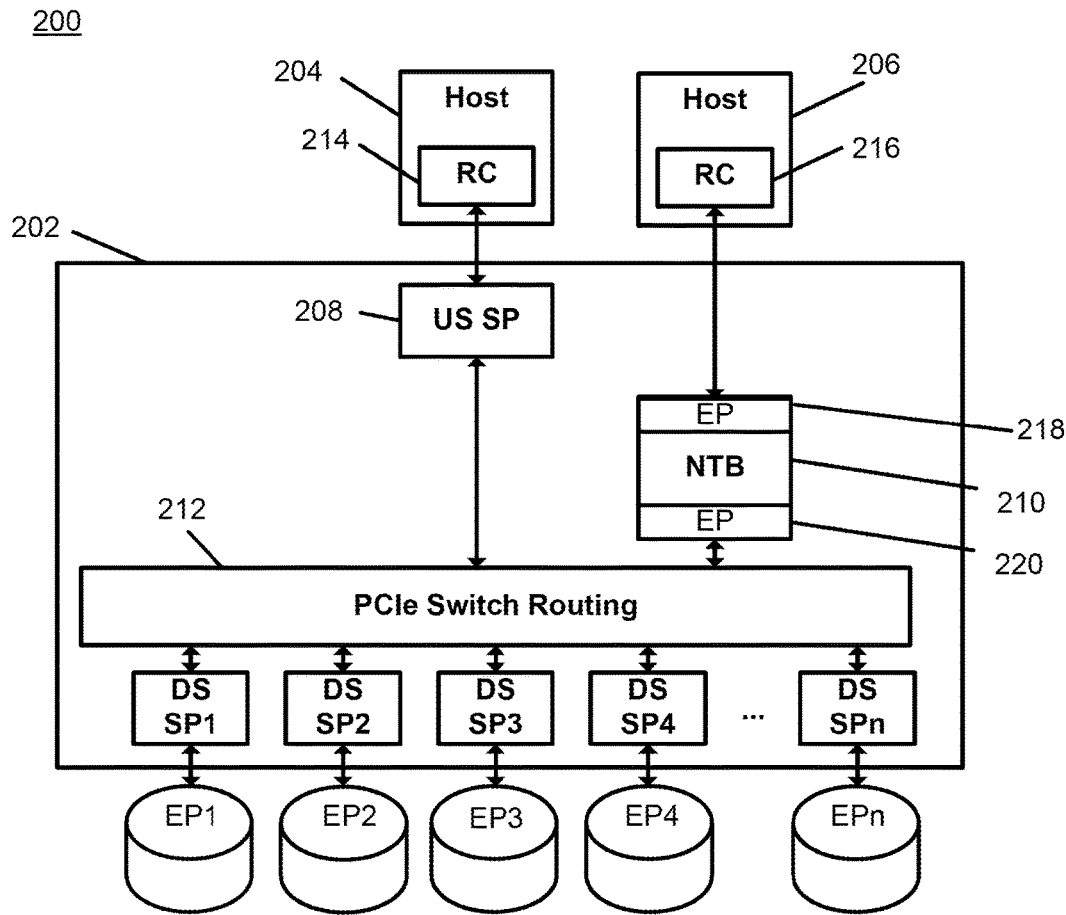
FIG. 2 is a block diagram of a known PCI Express communication system with a Non-Transparent PCI Express Bridge.
Figure 3:
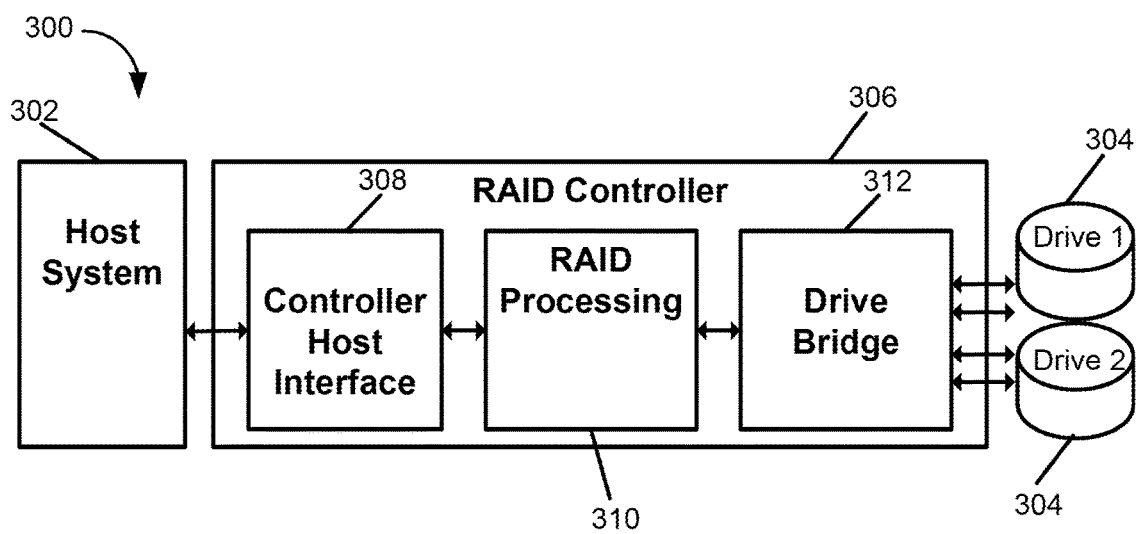
FIG. 3 is a block diagram of a known a RAID controller.

According to an aspect, the present disclosure provides a method of communicating transactions in a peripheral component interconnect express (PCIe) switch. The method includes receiving, at the PCIe switch having a drive switch domain and a host switch domain, a request transaction originating in the drive switch domain, the request transaction having a destination address, the PCIe switch comprising a host domain address map associated with the host switch domain and a drive domain address map associated with the drive switch domain. In response to determining, at the PCIe bridge, that the destination address of the request transaction is absent from the drive domain address map, and the drive domain address map being a subset of the host domain address map, transferring the request transaction directly from the drive switch domain, via a selectively transparent bridge within the PCIe switch, to the host switch domain. In another aspect, transferring the request transaction includes transferring the transaction without changing the destination address of the request transaction. In another aspect, determining comprises comparing the destination address of the request transaction with Endpoint Base Address Registers (EP BARs) and a Root Complex Base Address Register (RC BAR) in the drive domain address map, and wherein the destination address is determined to be absent from the drive domain address map when the destination address of the request transaction does not match one of EP BARs and the RC BARs.

In another aspect, the method includes modifying the request transaction to appear to have originated from a device associated with a bus number within the host switch domain. In still another aspect, modifying the request transaction comprises modifying an endpoint requester identifier of the request transaction. In still another aspect, modifying the request transaction comprises modifying a transaction tag of the request transaction to ensure unique transaction tag values from different endpoints.

In another aspect, the method includes receiving, at the PCIe switch, a completion transaction originating in the virtual switching host domain, and modifying, at the PCIe bridge, a completion transaction identifier of the completion transaction to match a request transaction identifier associated with the request transaction that resulted in the completion transaction.

In another aspect, there is provided a peripheral component interconnect express (PCIe) switch. The PCIe switch includes a host switch domain addressable via a host domain address map, the host switch domain configured to communicate transactions with a host and a controller, and a drive switch domain addressable via a drive domain address map, the drive domain address map being a subset of the host domain address map, the drive switch domain configured to communicate transactions with endpoints and the controller. The PCIe switch also includes a selectively transparent bridge connected to the host switch domain and to the drive switch domain. The selectively transparent bridge configured to: receive a request transaction originating in the drive switch domain, the transaction having a destination address; and in response to a determination that the destination address of the request transaction is absent from the drive domain address map, transfer the request transaction directly from the drive switch domain to the host switch domain.

In another aspect, the selectively transparent bridge is configured to transfer the destination address without translation directly from the drive switch domain to the host switch domain. In still another aspect, the endpoints comprise PCIe endpoints and the PCIe endpoints are configured as a redundant array of independent disks (RAID), and the controller is a RAID controller.

In another aspect, the selectively transparent bridge is configured to compare the destination address of the request transaction with Endpoint Base Address Registers (EP BARs) and a Root Complex Base Address Register (RC BAR) allocated to the drive switch domain, and wherein the destination address is determined to be absent from the drive domain address map when the destination address of the request transaction does not match one of EP BARs and the RC BARs.

In another aspect, the selectively transparent bridge is further configured to: modify the request transaction to appear to have originated from a device associated with a bus number within the host switch domain. In still another aspect, the selectively transparent bridge is further configured to modify an endpoint requester identifier of the request transaction. In still another aspect, the selectively transparent bridge is further configured to modify a transaction tag of the request transaction to ensure unique transaction tag values from different endpoints. In still another aspect, the selectively transparent bridge is further configured to: receive a completion transaction originating in the host switch domain, and modify a completion transaction identifier of the completion transaction to match a request transaction identifier associated with a request transaction that resulted in the completion transaction.

In another aspect, there is provided a method of communicating transactions in a peripheral component interconnect express (PCIe) switch. The method includes receiving, at the PCIe switch having a drive switch domain and a host switch domain, a transaction originating in the drive switch domain, the transaction having a destination address, the PCIe switch comprising a host domain address map associated with the host switch domain and a drive domain address map associated with the drive switch domain, the host domain address map comprising an address window, and the drive domain address map comprising a bridge path to the host switch domain, the bridge path to the host switch domain comprising one or more Base Address Register (BAR) that uniquely identify the address window in the host domain address map. In response to determining that the destination address of the request transaction is within the bridge path to the host switch domain, transferring the transaction directly from the drive switch domain, via a selectively transparent bridge within the PCIe switch, to the host switch domain.

In another aspect, transferring the request transaction includes transferring the transaction without changing the destination address of the request transaction. In another aspect, determining includes comparing the destination address of the request transaction with the one or more BARs in the bridge path to the host switch domain and wherein the destination address is determined to be within the bridge path to the host switch domain when the destination address of the request transaction matches one of the one or more BARs in the bridge path to the host switch domain. In another aspect, the method includes modifying the request transaction to appear to have originated from an endpoint associated with a bus number within the PCIe switch inside the host switch domain. In another aspect, modifying the request transaction includes modifying an endpoint requester identifier of the request transaction. In another aspect, the method includes modifying a transaction tag of the request transaction to ensure unique transaction tag values among non-posted transactions. In another aspect, the method includes receiving a completion transaction originating in the host switch domain, and modifying, at the PCIe bridge, a completion transaction identifier of the completion transaction to match a request transaction identifier associated with a request transaction that resulted in the completion transaction.

In another aspect, there is provided a peripheral component interconnect express (PCIe) switch that includes a host switch domain addressable via a host domain address map. The host switch domain is configured to communicate transactions with a host and a controller. The host domain address map includes an address window. The PCIe switch also includes a drive switch domain addressable via a drive domain address map, the drive domain address map being a subset of the host domain address map. The drive switch domain is configured to communicate transactions with endpoints and the controller. The drive domain address map includes a bridge path to the host switch domain. The bridge path to the host switch domain includes one or more Base Address Register (BAR) that uniquely identify the address window in the host domain address map. The PCIe switch also includes a selectively transparent bridge connected to the host switch domain and to the drive switch domain, the selectively transparent bridge configured to: receive a transaction originating in the drive switch domain, the transaction having a destination address, and in response to determining that the destination address of the request transaction is within the bridge path to the host switch domain, transfer the transaction directly from the drive switch domain to the host switch domain.

In another aspect, the selectively transparent bridge is configured to transfer the destination address without translation directly from the drive switch domain to the host switch domain. In still another aspect, the endpoints comprise PCIe endpoints and the PCIe endpoints are configured as a redundant array of independent disks (RAID), and the controller is a RAID controller. In still another aspect, determining includes comparing the destination address of the request transaction with the one or more BARs in the bridge path to the host switch domain and wherein the destination address is determined to be within the bridge path to the host switch domain when the destination address of the request transaction matches one of the one or more BARs in the bridge path to the host switch domain. In still another aspect, the selectively transparent bridge is further configured to: compare the destination address of the request transaction with Endpoint Base Address Registers (EP BARs) and a Root Complex Base Address Register (RC BAR) in the drive domain address map; and in response to a determination that the destination address of the request transaction matches one of EP BARs or the RC BAR, route the request transaction to an endpoint in the drive switch domain that is associated with the destination address.

In still another aspect, the selectively transparent bridge is configured to: in response to a determination that the destination address of the request transaction does not match one of the plurality of EP BARs and the Root Complex BAR, route the request transaction to an internal route complex of a RAID controller for flagging as an error. In still another aspect, the selectively transparent bridge is further configured to: modify the request transaction to appear to have originated from a device associated with a bus number within the host switch domain.

In still another aspect, the selectively transparent bridge is further configured to modify an endpoint requester identifier of the request transaction. In still another aspect, the selectively transparent bridge is further configured to modify a transaction tag of the request transaction to ensure unique transaction tag values from different endpoints. In still another aspect, the selectively transparent bridge is further configured to: receive a completion transaction originating in the host switch domain, and modify a completion transaction identifier of the completion transaction to match a request transaction identifier associated with a request transaction that resulted in the completion transaction.

The disclosure generally relates to a PCIe switch that includes a selectively transparent PCIe bridge that selectively allows transactions to traverse between multiple PCIe domains without the encumbrance of each root complex entity requiring knowledge of the selectively transparent bridge. The selectively transparent bridge is effectively invisible. In an example embodiment, a request transaction arriving from a switch port in a drive switch domain is allowed to transfer to the host switch domain within the PCIe switch. The selectively transparent bridge that enables these transactions is invisible to the root complex entity in the host and drive switch domain, and no address translation is required because the drive switch domain address map is a subset of the host switch domain address map.

Figure 4:
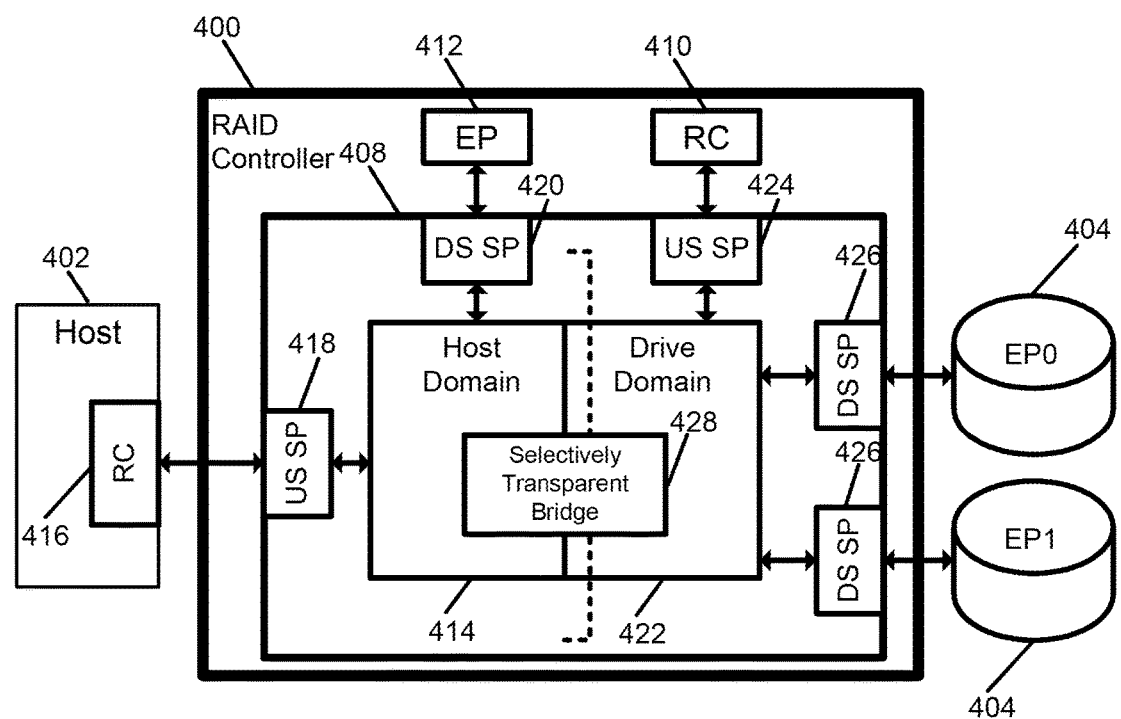
FIG. 4 is a block diagram of a RAID controller with a PCIe switch that includes a selectively transparent bridge according to an embodiment of the present disclosure.

FIG. 4 illustrates a block diagram of an embodiment a RAID controller 400 that connects a host 402, such as a computer or a server, to two endpoints 404. In the embodiment shown in FIG. 4, the two endpoints 404 are physical storage media that are external to the RAID controller 400.

The RAID controller 400 includes a multi-domain PCIe switch 408, root complex entity 410, and an internal endpoint 412 which is the primary command and control path between the host system 402 and the RAID controller 400.

The PCIe switch 408 includes a host switch domain 414 that connects to a root complex entity 416 of the host 402 via an upstream switch port 418. The host switch domain 414 also connects to the internal endpoint 412 of the RAID controller 400 via a downstream switch port 420. The PCIe switch 408 also includes a drive switch domain 422 that connects to the internal root complex entity 410 of the RAID controller 400 via an upstream switch port 424 and to the multiple endpoints 404 via downstream switch ports 426.

The RAID controller 400 also includes a selectively transparent bridge 428 that connects the host switch domain 414 to the drive switch domain 422. The selectively transparent bridge 428 is configured to transfer request transactions directly from the drive switch domain 422 to the host switch domain 414 without requiring address translation for the request transactions that traverse the selectively transparent bridge 428.

Address Decode and Domain Memory Maps

Figure 5:
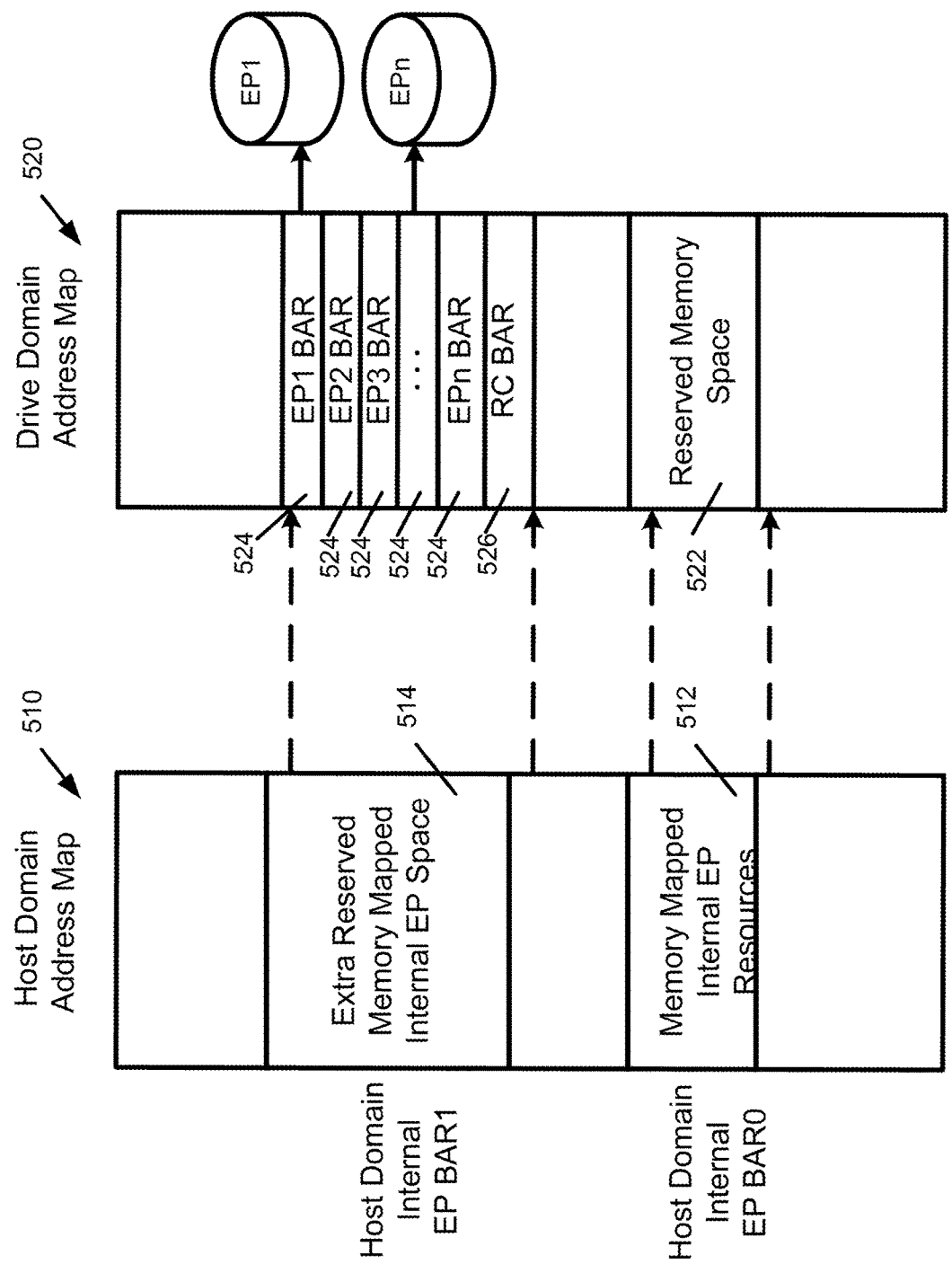
FIG. 5 is a block diagram illustrating host and drive domain address maps of the PCIe switch of FIG. 4 according to an embodiment of the present disclosure.

FIG. 5 illustrates a block diagram of an example host switch domain and drive switch domain PCI Address Map after enumeration. In an embodiment of the present disclosure, no address translation is required because the drive domain address map is a subset of the host domain address map. Referring to both FIG. 4 and FIG. 5, enumeration in the host domain 414 is first performed by the root complex entity 416 of the host 402. Enumeration in the drive switch domain 422 and assignment of the BAR registers of all endpoints 404 are performed by the internal root complex entity 412 of the RAID controller 400. The internal root complex entity 412 completes enumeration after the host 402 has defined the physical address of BAR1 in the host domain memory map 510.

An enumeration example has the internal endpoint 412 requesting two PCI BARs, internal EP BAR0 and internal EP BAR1, from the root complex entity 416 of the host 402. Internal EP BAR0 represents the internal resources of the RAID Controller 400 and also represents the memory window 512 used by the host system 402 to communicate with the RAID Controller 400. Internal EP BAR1 represents an excess amount of PCI memory space 514 requested by the RAID Controller 400. The internal endpoint 412 must request sufficient host PCI memory space in the "excess" BAR1 region to fully encapsulate all Root Complex BARs and all endpoint BARs in the drive domain.

Accesses from the host system 402 to the internal endpoint BAR1 will complete successfully. The data returned from a non-posted request transaction, however, is undefined because there is no physical memory at that location, and no path from the host switch domain to the drive switch domain exists. As a result there is no mechanism for request transactions from the host switch domain to traverse the selectively transparent bridge 428, resulting in complete separation of the host 402 from the endpoints 404 (i.e., the physical storage drives).

Implicit Address Detection in the Bridge

Figure 6:
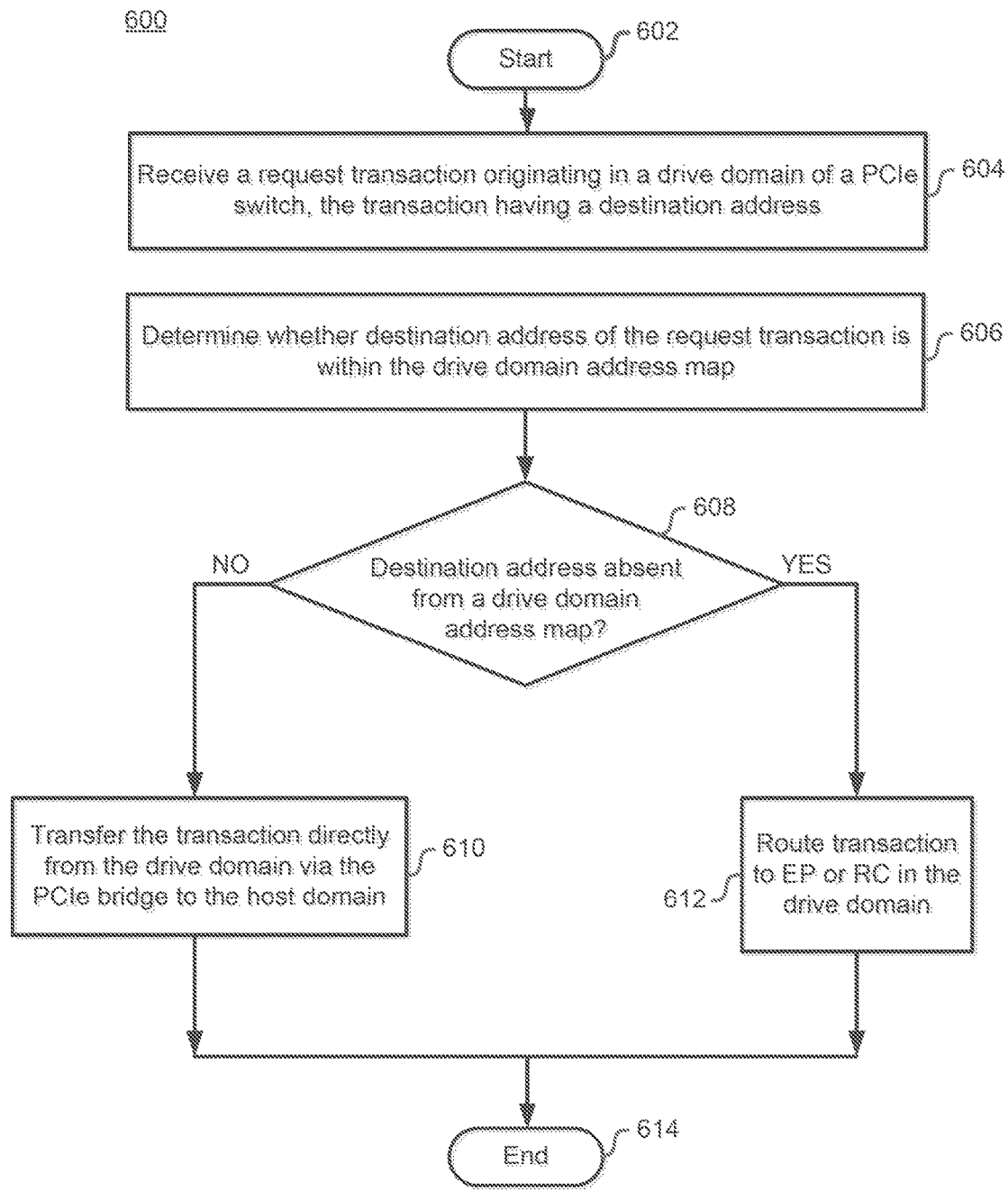
FIG. 6 is a flowchart illustrating a method of communicating transactions in a PCIe switch utilizing implicit address detection according to an embodiment of the present disclosure.

FIG. 6 is a flowchart illustrating a method 600 of communicating transactions in a PCIe communication switch utilizing implicit address detection in accordance with an embodiment of the present disclosure. The method begins at 602. At 604, a request transaction is received at a PCIe switch having a drive switch domain and a host switch domain. The request transaction originates in the drive switch domain and has a destination address. At 606, a determination is made, at a selectively transparent PCIe bridge within the PCIe switch, whether the destination address is within the drive domain address map utilizing implicit address detection.

In the embodiment shown in FIG. 6, the drive domain address map includes a plurality of EP BARs 524 and a Root Complex (RC) BAR 526 allocated to the drive switch domain, and the drive domain address map 520 is a subset of the host domain address map. At 606, the determination is made whether the destination address is within the drive switch domain address map utilizing implicit address detection by comparing the destination address of the transaction with EP BARs 524 and the Root Complex BAR 526. The method then proceeds to 608. At 608, if the destination address of the request transaction does not match the EP BARs 524 or the Root Complex BAR 526, the destination address of the request transaction is absent from the drive domain address map, and the method proceeds to 610. At 610, the request transaction is transferred directly from the drive switch domain, via a selectively transparent PCIe bridge within the PCIe switch, to the host switch domain without changing the destination address. The method then proceeds to 614 where the method ends.

If at 608 the destination address of the request transaction matches any one of the EP BARs 524, or the RC BAR 526, the destination address of the request transaction is within the drive domain address map and the method proceeds to 612. At 612, the request transaction is routed, by the selectively transparent PCIe bridge, to an endpoint in the drive switch domain associated with the destination address of the request transaction. The method then proceeds to 614 where the method ends.

Figure 7:
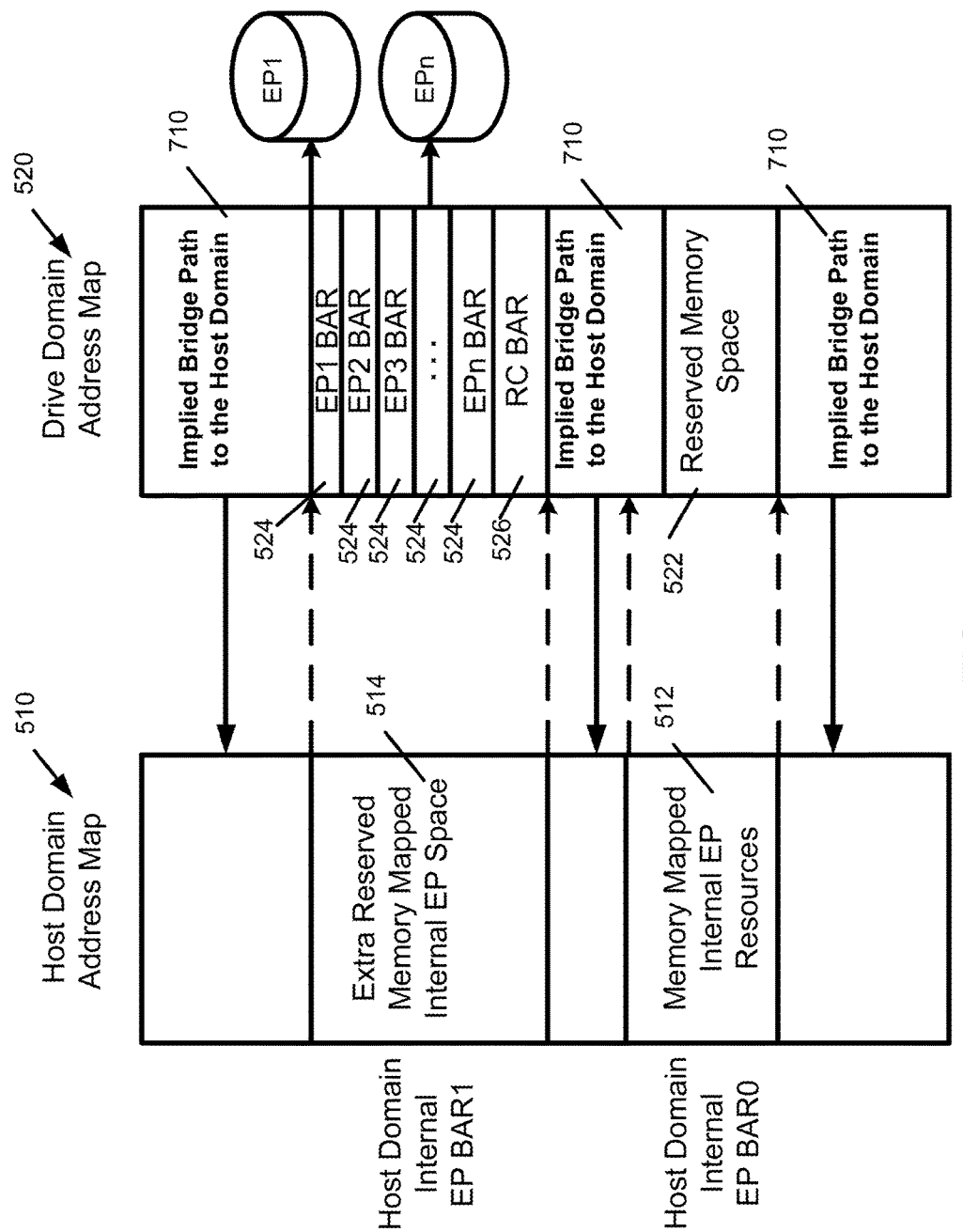
FIG. 7 is a block diagram illustrating the method of communicating of FIG. 6 in relation to the address maps of FIG. 5 according to an embodiment of the present disclosure.

FIG. 7 is a block diagram illustrating the implicit address detection of FIG. 6 in relation to the address maps of FIG. 5 according to an embodiment of the present disclosure. To support implicit address detection, the selectively transparent bridge 428 of the present disclosure has knowledge of the EP BARs 524 and RC BAR 526 for all switch ports in the drive switch domain. When a request transaction is received in the drive switch domain, the selectively transparent bridge 428 compares the destination address of the request transaction against all EP BARs 524 and the Root Complex BAR 526 associated with the internal root complex entity 412 of the RAID controller 400. When no match exists in these addresses associated with the drive switch domain, it is implied that the request transaction is for the host system 402 and the request transaction is transferred directly from the drive switch domain 422 to the host switch domain 414, without translating the destination address via the Implied Bridge Paths to the Host Domain 710.

According to the bridge address implicit mapping scheme shown in FIG. 7, request transactions originating in the drive switch domain that do not match any of the EP BARs 524 or the RC BAR 526 and are not in the reserved memory space 522, are transferred to the host switch domain without changing the destination address of the request transactions. All of the host address space is accessible to the drive switch domain using this capability.

Explicit Address Detection in the Bridge

Figure 8:
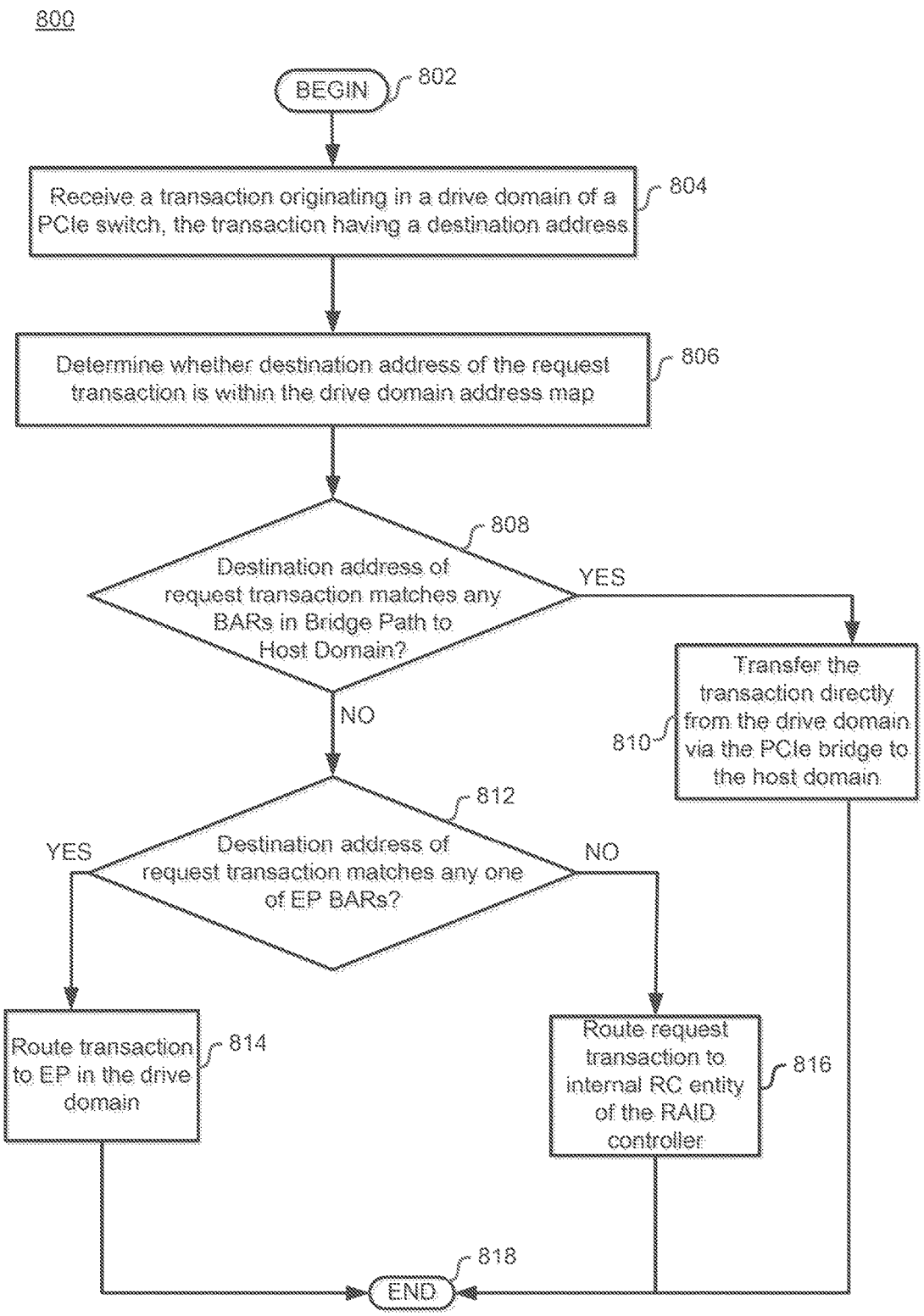
FIG. 8 is a flowchart illustrating a method of communicating transactions in a PCIe switch utilizing explicit address detection according to another embodiment of the present disclosure.
Figure 9:
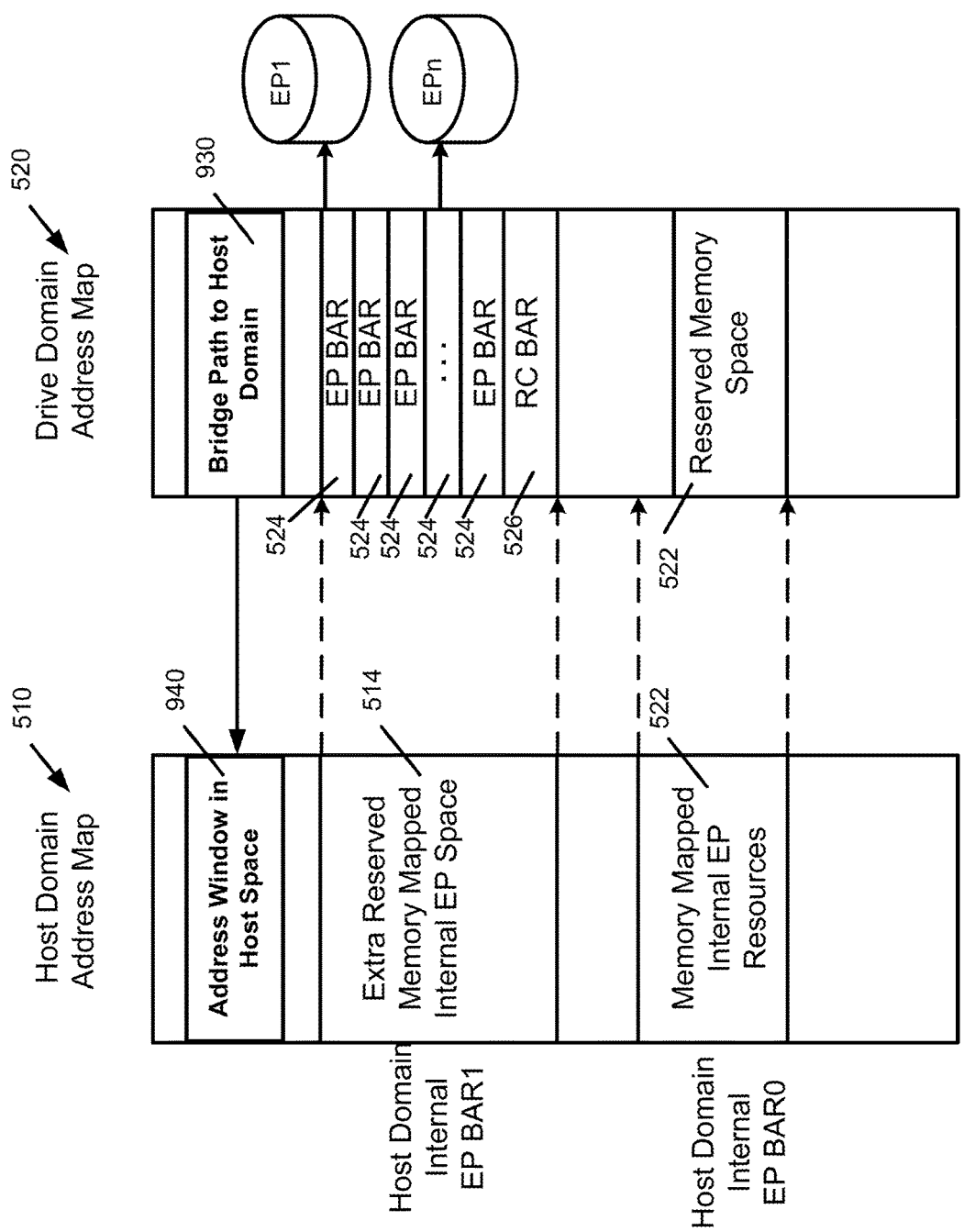
FIG. 9 is a block diagram illustrating the method of communicating of FIG. 8 in relation to the address maps of FIG. 5 according to an embodiment of the present disclosure.

A method of communicating transactions in a PCIe switch utilizing explicit address detection in accordance with another embodiment of the present disclosure will now be described with reference to FIG. 8 and FIG. 9. FIG. 8 is a flowchart illustrating a method 800 of communicating transactions in a PCIe switch utilizing explicit address detection. FIG. 9 is a block diagram illustrating the explicit address detection of FIG. 8 in relation to the address maps of FIG. 5 according to an embodiment of the present disclosure.

The method begins at 802. At 804, a request transaction is received at a PCIe switch having a drive switch domain and a host switch domain. The request transaction originates in the drive switch domain and has a destination address. At 806, a determination is made, at a selectively transparent PCIe bridge within the PCIe switch, whether the destination address is within the drive domain address map utilizing explicit address detection.

In the embodiment shown in FIG. 8, the drive domain address map includes a plurality of EP BARs 524, including a RC BAR 526 allocated to the drive domain, and a Bridge Path to the Host Domain 930 that includes one or more BARs that uniquely identify memory windows in the host domain address map. In this embodiment, the drive domain address map is a subset of the host domain address map. At 806, the determination is made whether the destination address of the request transaction is within the host domain address map by comparing the destination address of the request transaction to the one or more BARs in the Bridge Path to the Host Domain 930 that uniquely identify the one or more Address Windows in the Host Space 940 in the host domain address map. The method then proceeds to 808 where the method determines whether the destination address of the request transaction matches one of the one or more BARs in the Bridge Path to the Host Domain 930.

At 808, if the destination address of the request transaction matches any one of the BARs in the Bridge Path BAR to Host Domain 930, then method proceeds to 810. At 810, the request transaction is transferred directly from the drive switch domain, via the PCIe bridge, to the host switch domain without changing the destination address. The method then proceeds to 820 where the method ends.

If, at 808, the destination address of the request transaction does not match the one or more BARs in the Bridge Path to Host Domain 930, then the method proceeds to 812. At 812, the destination address of the request transaction is compared to the EP BARs 524 and the RC BAR 526. If at 812, the destination address of the request transaction matches any one of the EP BARs 524 or the RC BAR 526, then the method proceeds to 814. At 814, the request transaction is sent to the drive switch domain for routing to an endpoint in the drive switch domain associated with the destination address of the request transaction. In an embodiment, the drive switch domain address logic determines the routing to BARs within the drive switch domain. The method then proceeds to 820 where the method ends.

If, at 812, the destination address of the request transaction does not match any of the EP BARs 524 or the RC BAR 526, then the method proceeds to 816. At 816, the request transaction is routed implicitly to an internal root complex entity of a RAID controller where the request transaction is flagged as an error. The method the proceeds to 818 where the method ends.

In the embodiment shown in FIG. 9, since the selectively transparent bridge 428 presents no endpoint to the host switch domain 414 or drive switch domain 422, the one or more BARs in the Bridge Path to the Host Domain 930 must be configured separate from, and outside the PCIe configuration space. Configuration of the Address Window in the Host Space 940 is accomplished using direct register reads and writes by a central processing unit of the RAID controller 400.

Transactions that do not match any of the EP BARs 524 or the RC BAR 526 in the drive switch domain, and do not match a BAR in the Bridge Path to Host Domain 930, are flagged in the internal root complex entity of the RAID controller 400 as errors.

Figure 10:
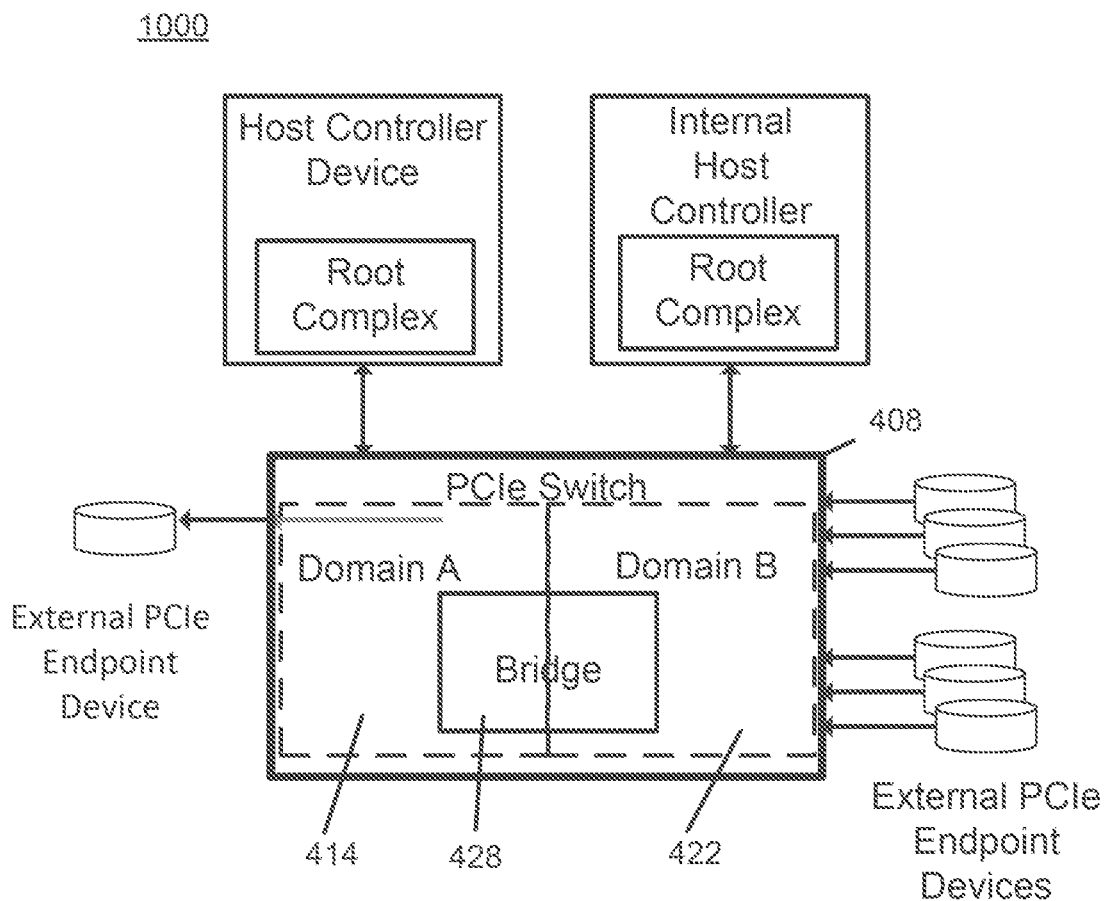
FIG. 10 is a logical block diagram of a PCI Express communication system that includes the PCIe switch of FIG. 4, in which the PCIe switch has a two domain selectively transparent bridge.

FIG. 10 is a logical block diagram of a PCI Express communication system 1000 that includes a PCIe switch 408 with two domains, 414, 422 and a selectively transparent bridge 428, in accordance with an embodiment of the present disclosure. In an embodiment, Domain A 414 is a host switch domain and Domain B 422 is a drive switch domain, and both of domains 414, 422 share a single address range whereby each domain 414, 422 consists of a unique subset of the total address range. In the embodiment of FIG. 10, the PCIe switch 408 that includes the selectively transparent bridge 428 that may utilize either implicit or explicit address detection of request transactions that are intended to traverse through the selectively transparent bridge 428 from drive switch domain 422 to host switch domain 414 for admission to the PCIe bridge 428. When implicit address detection is utilized, the selectively transparent bridge 428 detects that the transaction is not intended for any switch port in the drive switch domain 422, as described in relation to FIG. 6 and FIG. 7. The transaction is passed to the host switch domain 414 and is routed to its intended target. Transaction ID translation is supported for request transactions entering and completion transactions returning from the host switch domain. The entire host PCIe address space is available for these transactions.

Figure 11:
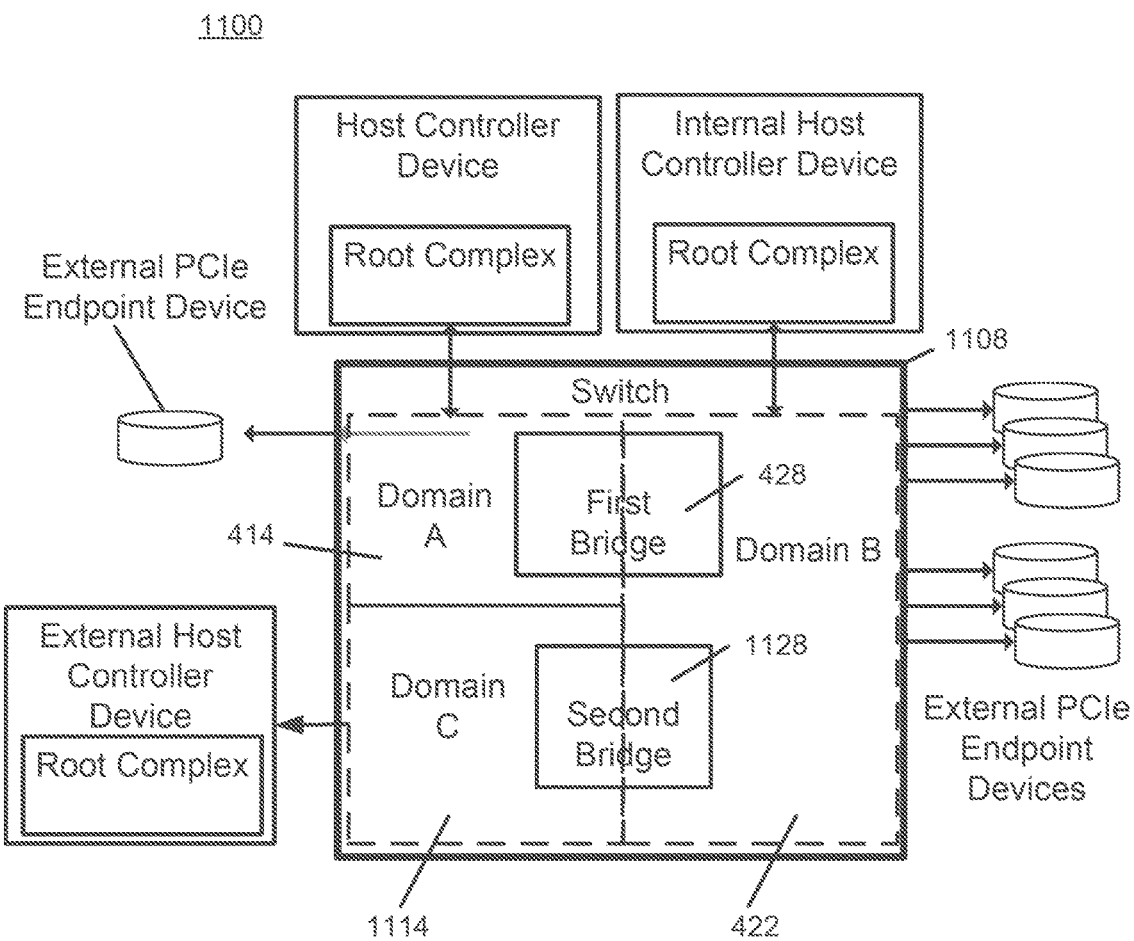
FIG. 11 is a logical block diagram of a PCI Express communication system that includes the PCIe switch of FIG. 4, in which the PCIe switch has a three domain selectively transparent bridge according to another embodiment of the present disclosure.

FIG. 11 is a logical block diagram of a PCIe communication system 1100 that includes a PCIe switch 1108 with three domains, Domain A, 414, Domain B 1114, and Domain C, 422, and two selectively transparent bridges 428 and 1128 according to another embodiment of the present disclosure. The PCIe switch 1108 drive switch domain 422 utilizes explicit address detection of transactions that are intended for admission to the two selective transparent bridges 428 and 1128. This is accomplished by detecting that the request transaction address matches one or more predetermined address windows in the drive PCIe address map, as described in relation to FIG. 8 and FIG. 9. In the embodiment of FIG. 11, Domain A 414 and Domain C 1114 are host switch domains, and Domain B 422 is a drive switch domain. As in FIG. 10, the transaction is passed to the host switch domain, in this example one of host switch domains A or C, 414 or 1114, and routed to its intended target. Transaction ID translation is supported for request transactions entering and completion transactions returning from the host switch domains 414, 1114. A three-domain PCIe switch 1108 with two selectively transparent bridges 428, 1128, as shown in FIG. 11, must utilize explicit address detection. The explicit address windows for host switch domains A and C, 414, 1114 are mutually exclusive for the three-domain PCIe switch 1108.

Transaction ID Translation

Figure 12:
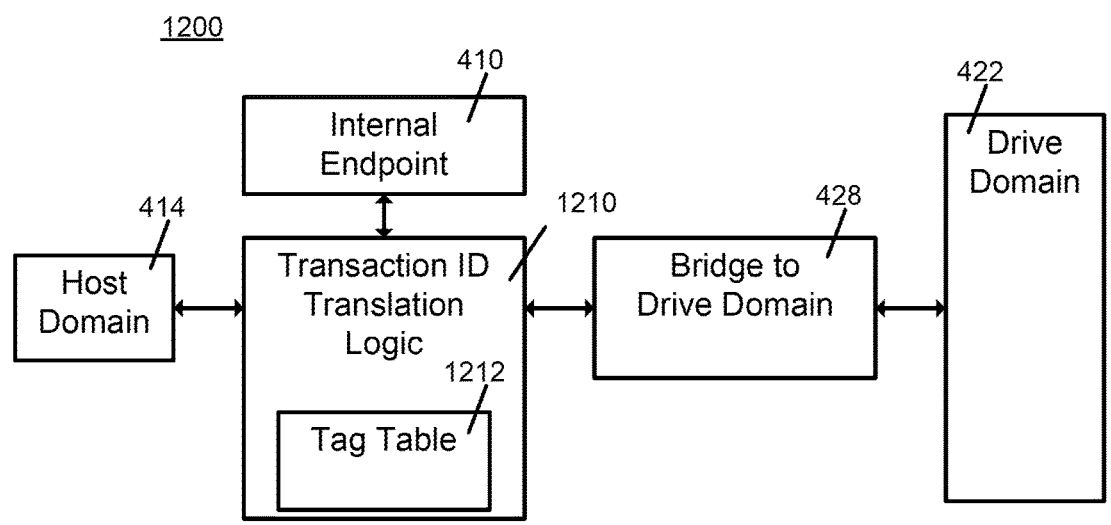
FIG. 12 is a logical block diagram of a PCIe switch according to an embodiment of the present disclosure including transaction identifier translation logic.

FIG. 12 is a logical block diagram of a PCIe communication system 1200 according to an embodiment of the present disclosure including transaction identifier translation logic 1210. In an embodiment, request transactions from the drive switch domain 422 that traverse the selectively transparent bridge 428 to the host switch domain 414 must be modified to appear as if they originated from a PCIe entity within the PCIe Switches 408 host switch domain 414. The internal endpoint 412, upstream switch port 418, or some other device/function number associated with the bus number inside the PCIe switch 408 may also be used for the transaction ID for these request transactions. The transaction Tag is also modified to ensure that two outstanding transactions do not have the same Tag value.

Completion transactions from the host switch domain 414 that traverse the selectively transparent bridge 428 to the drive switch domain 422 must have their complete transaction ID (Bus Number, Device Number, Function Number and Tag) replaced with the values from the original request transaction.

As shown in the example embodiment of FIG. 12, the Tag ID Translation Logic 1210 comprises a Tag Table 1212, which in an example implementation has a maximum of 256 entries. This matches the maximum number of available tags for a single requester defined by the Tag field in the PCIe transaction, though the number of transactions in flight may be limited by the number of non-posted credits provided by the host. When a new non-posted request transaction arrives at the Tag Translation Logic 1210 from the selectively transparent bridge 428, a free tag is located in the Tag Table 1212. When the Tag Table 1212 is full, no additional non-posted transactions may be sent and further transactions are backpressured until an entry in the Tag Table 1212 has been freed by a completion transaction received from the host. The address of the free entry from the table becomes the new Transaction Tag value, and the requester ID is replaced with the requester ID of the internal endpoint 410. When end-to-end cyclic redundancy check (ECRC) is enabled, a checksum update is performed to correct the ECRC field to match the new transaction contents.

With reference to the elements in both FIG. 12 and FIG. 4, posted request transactions are passed across the selectively transparent bridge 428 to the host switch domain 414 through the upstream switch port 418 to the host root complex entity 416. The requester ID is replaced for posted request transactions, however, the original requester ID is not stored in the Tag Table 1212 because the Tag field is unchanged.

When the request transaction is non-posted, then the complete transaction ID from the original request transaction from the drive switch domain 422 is stored in the Tag Table 1212 and the modified request transaction is sent to the host switch domain 414, through the upstream switch port 416 to the root complex entity 416 of the host system 402.

When the completion transaction for that non-posted request transaction is received by the PCIe switch 408, the Tag Field of the TLP header is used as the index to the Tag Table 1212 to fetch the Original Transaction ID, which replaces the completion transaction ID. If ECRC is enabled, an incremental checksum update is performed to correct the ECRC field to match the new TLP header values. The completion transaction is then passed to the selectively transparent bridge 428 and on to the drive switch domain 422.

In an example embodiment, a timer is started for each non-posted request transaction when the entry is written to the Tag Table 1212. An entry is removed from the Tag Table 1212 if the timer for that entry expires. The Tag timeout provides support for completion transaction timeouts for transactions sent to the host by a drive Endpoint. Without the Tag Table entry timer, a completion timeout would result in stale entries in the Tag Table 1212 that inhibit the use of its associated tag value forever.

Transactions from the internal endpoint to the host are handled in one of two ways. The first option is to reserve the lower $2^n$ values where n≤7 so that requests from the internal endpoint may be sent to the host without modification. No Tag Translation is required in this case. The second option is to treat transactions from the internal endpoint identically to the transactions from the selectively transparent bridge 428. In this case all Transaction ID's for request transactions sent to the host will be translated using this option.

Referring back to the logical architecture of the Transaction ID Translation Logic in the system as shown in FIG. 12, translations are performed for all transactions that traverse the selectively transparent bridge 428, and may be performed for request transactions from the internal endpoint. Request transactions from the host to the internal endpoint and completion transactions from the internal endpoint to the host are never translated.

Transaction Completion

Once the modified completion transaction has been passed to the drive domain ID based routing is used within the drive domain to determine where it should be routed. This behavior is identical to any other completion transaction in a PCI switch.

Upstream Error Containment

The selectively transparent bridge of the present disclosure facilitates routing of upstream transactions from external endpoints to the external host instead of to a local peer or to the internal root complex entity. It is important that error transactions are not allowed to traverse the selectively transparent bridge and be exposed to the host system. In an alternative embodiment, the selectively transparent bridge of the present disclosure includes the ability to trap on error conditions and TLPs. Examples of trapped errors include poisoned TLPs, completer abort response, and unsupported request. These transactions are trapped, inspected by a programmable entity within the PCIe switch, then optionally modified before being forwarded or dropped Advantageously, the selectively transparent bridge of the present disclosure facilitates extremely low latency transactions between host systems and physical storage drives because it allows the drive to read the Direct Memory Access (DMA) Scatter-Gather List (SGL) directly from host memory. It also allows I/O data reads and writes from the drive directly to the host memory without store and forward within the RAID controller's memory. One of the primary benefits of PCI Express based solid state storage is low latency transfers between the Host and Drives. A RAID application using a standard two domain switch requires a store and forward of the entire I/O Data within the RAID controller's memory. The latency reduction provided by the selectively transparent bridge over standard store and forward type system architectures can be as high as 60%. This provides significant benefit to server and storage OEMs.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications, and variations may be effected to the particular embodiments by those of skill in the art without departing from the scope, which is defined solely by the claims appended hereto.

What is claimed is:

1. A method of communicating transactions in a peripheral component interconnect express (PCIe) switch, the method comprising:

receiving, at the PCIe switch having a drive switch domain and a host switch domain, a transaction originating in the drive switch domain, the transaction having a destination address, the PCIe switch comprising a host domain address map associated with the host switch domain and a drive domain address map associated with the drive switch domain, the host domain address map comprising an address window, and the drive domain address map comprising a bridge path to the host switch domain, the bridge path to the host switch domain comprising one or more Base Address Register (BAR) that uniquely identify the address window in the host domain address map;

in response to determining that the destination address of the request transaction is within the bridge path to the host switch domain, transferring the transaction directly from the drive switch domain, via a selectively transparent bridge within the PCIe switch, to the host switch domain.

2. The method of claim 1, wherein transferring the request transaction comprises transferring the transaction without changing the destination address of the request transaction.

3. The method of claim 1, wherein determining comprises comparing the destination address of the request transaction with the one or more BARs in the bridge path to the host switch domain and wherein the destination address is determined to be within the bridge path to the host switch domain when the destination address of the request transaction matches one of the one or more BARs in the bridge path to the host switch domain.

4. The method of claim 1, further comprising:
modifying the request transaction to appear to have originated from an endpoint associated with a bus number within the PCIe switch inside the host domain.

5. The method of claim 4, wherein modifying the request transaction comprises modifying an endpoint requester identifier of the request transaction.

6. The method of claim 4, further comprising:
modifying a transaction tag of the request transaction to ensure unique transaction tag values among non-posted transactions.

7. The method of claim 4, further comprising:
receiving a completion transaction originating in the host switch domain; and
modifying, at the PCIe bridge, a completion transaction identifier of the completion transaction to match a request transaction identifier associated with a request transaction that resulted in the completion transaction.

8. A peripheral component interconnect express (PCIe) switch comprising:
a host switch domain addressable via a host domain address map, the host switch domain configured to communicate transactions with a host and a controller, wherein the host domain address map comprising an address window;
a drive switch domain addressable via a drive domain address map, the drive domain address map being a subset of the host domain address map, the drive switch domain configured to communicate transactions with endpoints and the controller, wherein the drive domain address map comprises a bridge path to the host switch domain, the bridge path to the host switch domain comprising one or more Base Address Register (BAR) that uniquely identify the address window in the host domain address map; and
a selectively transparent bridge connected to the host switch domain and to the drive switch domain, the selectively transparent bridge configured to:
receive a transaction originating in the drive switch domain, the transaction having a destination address;
in response to determining that the destination address of the request transaction is within the bridge path to the host switch domain, transfer the transaction directly from the drive switch domain to the host switch domain.

9. The PCIe switch of claim 8, wherein the selectively transparent bridge is configured to transfer the destination address without translation directly from the drive domain to the host domain.

10. The PCIe switch of claim 8, wherein the endpoints comprise PCIe endpoints and the PCIe endpoints are configured as a redundant array of independent disks (RAID), and the controller is a RAID controller.

11. The PCIe switch of claim 8, wherein determining comprises comparing the destination address of the request transaction with the one or more BARs in the bridge path to the host switch domain and wherein the destination address is determined to be within the bridge path to the host switch domain when the destination address of the request transaction matches one of the one or more BARs in the bridge path to the host switch domain.

12. The PCIe switch of claim 11, wherein the selectively transparent bridge is further configured to:
compare the destination address of the request transaction with Endpoint Base Address Registers (EP BARs) and a Root Complex Base Address Register (RC BAR) in the drive domain address map; and
in response to a determination that the destination address of the request transaction matches one of EP BARs or the RC BAR, route the request transaction to an endpoint in the drive domain that is associated with the destination address.

13. The PCIe switch of claim 12, wherein the selectively transparent bridge is configured to:
in response to a determination that the destination address of the request transaction does not match one of the plurality of EP BARs and the Root Complex BAR, route the request transaction to an internal route complex of a RAID controller for flagging as an error.

14. The PCIe switch of claim 8, wherein the selectively transparent bridge is further configured to:
modify the request transaction to appear to have originated from a device associated with a bus number within the host switch domain.

15. The PCIe switch of claim 14, wherein the selectively transparent bridge is further configured to modify an endpoint requester identifier of the request transaction.

16. The PCIe of claim 14, wherein the selectively transparent bridge is further configured to modify a transaction tag of the request transaction to ensure unique transaction tag values from different endpoints.

17. The PCIe switch of claim 8, wherein the selectively transparent bridge is further configured to:
receive a completion transaction originating in the host switch domain; and
modify a completion transaction identifier of the completion transaction to match a request transaction identifier associated with a request transaction that resulted in the completion transaction.

* * * * *